US009374618B2

(12) United States Patent  
Costantino et al.

(10) Patent No.: US 9,374,618 B2
(45) Date of Patent: Jun. 21, 2016

(54) INTERACTIVE VISUAL ADVERTISEMENT SERVICE

(75) Inventors: Leandro I. Costantino, Carlos Paz (AR); Marcos E. Carranza, Cordoba (AR); Lucas A. Massuh, Cordoba (AR); Carlos H. Carrizo, Cordoba (AR)

(73) Assignee: Intel Corporation, Santa Clara, CA (US)

(*) Notice: Subject to any disclaimer, the term of this patent is extended or adjusted under 35 U.S.C. 154(b) by 586 days.

(21) Appl. No.: 13/610,314

(22) Filed: Sep. 11, 2012

(65) Prior Publication Data

US 2014/0072235 A1    Mar. 13, 2014

(51) Int. Cl.
| | |
|---|---|
| *G06K 9/00* | (2006.01) |
| *G06Q 30/00* | (2012.01) |
| *H04N 7/10* | (2006.01) |
| *H04N 21/45* | (2011.01) |
| *G06Q 30/02* | (2012.01) |
| *H04N 21/442* | (2011.01) |
| *H04N 21/478* | (2011.01) |
| *H04N 21/4784* | (2011.01) |
| *H04N 21/81* | (2011.01) |

(52) U.S. Cl.
CPC .......... *H04N 21/4524* (2013.01); *G06Q 30/02* (2013.01); *H04N 21/44218* (2013.01); *H04N 21/4784* (2013.01); *H04N 21/47815* (2013.01); *H04N 21/812* (2013.01)

(58) Field of Classification Search
None
See application file for complete search history.

(56) References Cited

U.S. PATENT DOCUMENTS

| 6,616,533 | B1 * | 9/2003 | Rashkovskiy | 463/31 |
|---|---|---|---|---|
| 7,225,414 | B1 * | 5/2007 | Sharma et al. | 715/863 |
| 8,745,541 | B2 * | 6/2014 | Wilson et al. | 715/863 |
| 2002/0015064 | A1 * | 2/2002 | Robotham et al. | 345/863 |
| 2005/0075927 | A1 * | 4/2005 | Nash | 705/14 |
| 2009/0099927 | A1 * | 4/2009 | Stewart et al. | 705/14 |
| 2009/0299840 | A1 * | 12/2009 | Smith | 705/14.19 |
| 2010/0207874 | A1 * | 8/2010 | Yuxin et al. | 345/156 |
| 2011/0156867 | A1 * | 6/2011 | Carrizo et al. | 340/5.85 |
| 2012/0154542 | A1 * | 6/2012 | Katz | A63F 13/06 348/47 |
| 2012/0179538 | A1 * | 7/2012 | Hines et al. | 705/14.43 |
| 2013/0004016 | A1 * | 1/2013 | Karakotsios et al. | 382/103 |
| 2013/0080242 | A1 * | 3/2013 | Alhadeff et al. | 705/14.39 |
| 2013/0241821 | A1 * | 9/2013 | Hiyama et al. | 345/156 |

* cited by examiner

*Primary Examiner* — Stephen R Koziol
*Assistant Examiner* — Sean Conner
(74) *Attorney, Agent, or Firm* — Blakely, Sokoloff, Taylor & Zafman LLP

(57) ABSTRACT

In accordance with embodiments disclosed herein, there are provided systems, apparatuses, and methods for implementing an interactive visual advertisement service as described herein. For example, in one embodiment, such means may include means for transmitting a message for display on an electronic visual display device in which the message includes a requested action to be performed by a user; means for receiving a sequence of electronic images of a performed action having been performed by the user subsequent to transmitting the message for display; means for evaluating the sequence of electronic images of the performed action by the user to determine whether the performed action by the user substantially matches the requested action of the message; and means for transmitting a notification for display on the electronic visual display device when the performed action by the user substantially matches the requested action of the message.

24 Claims, 9 Drawing Sheets

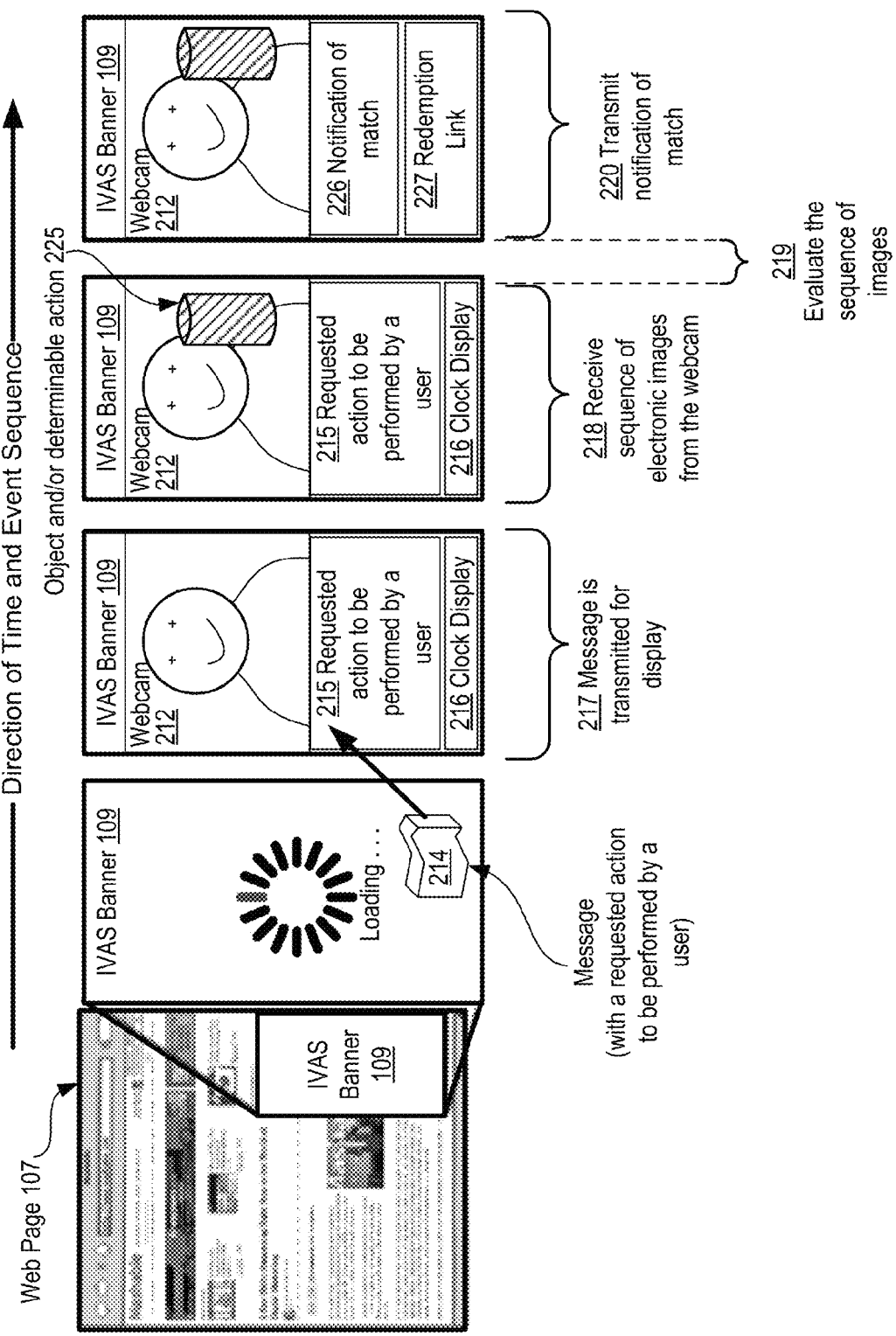

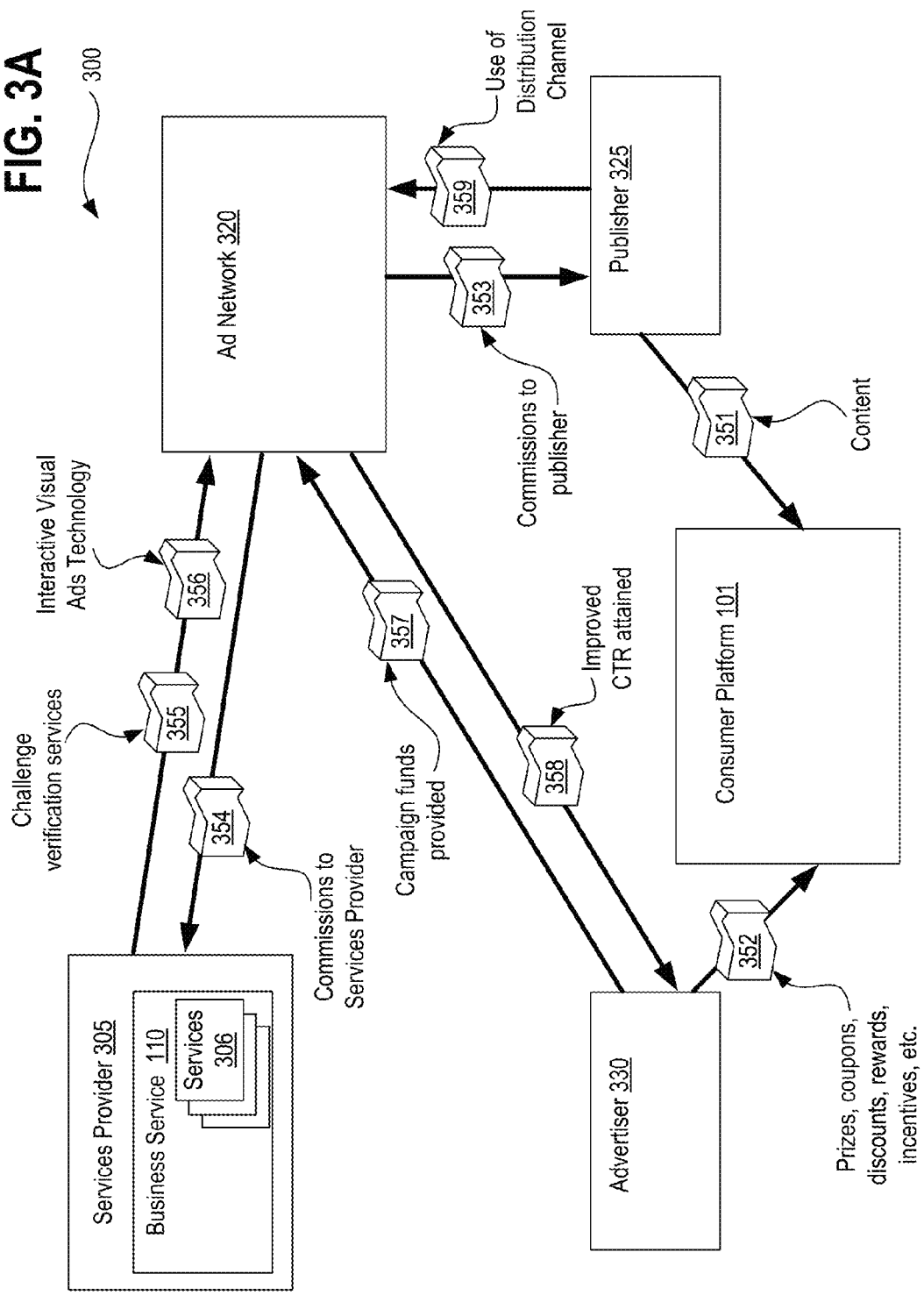

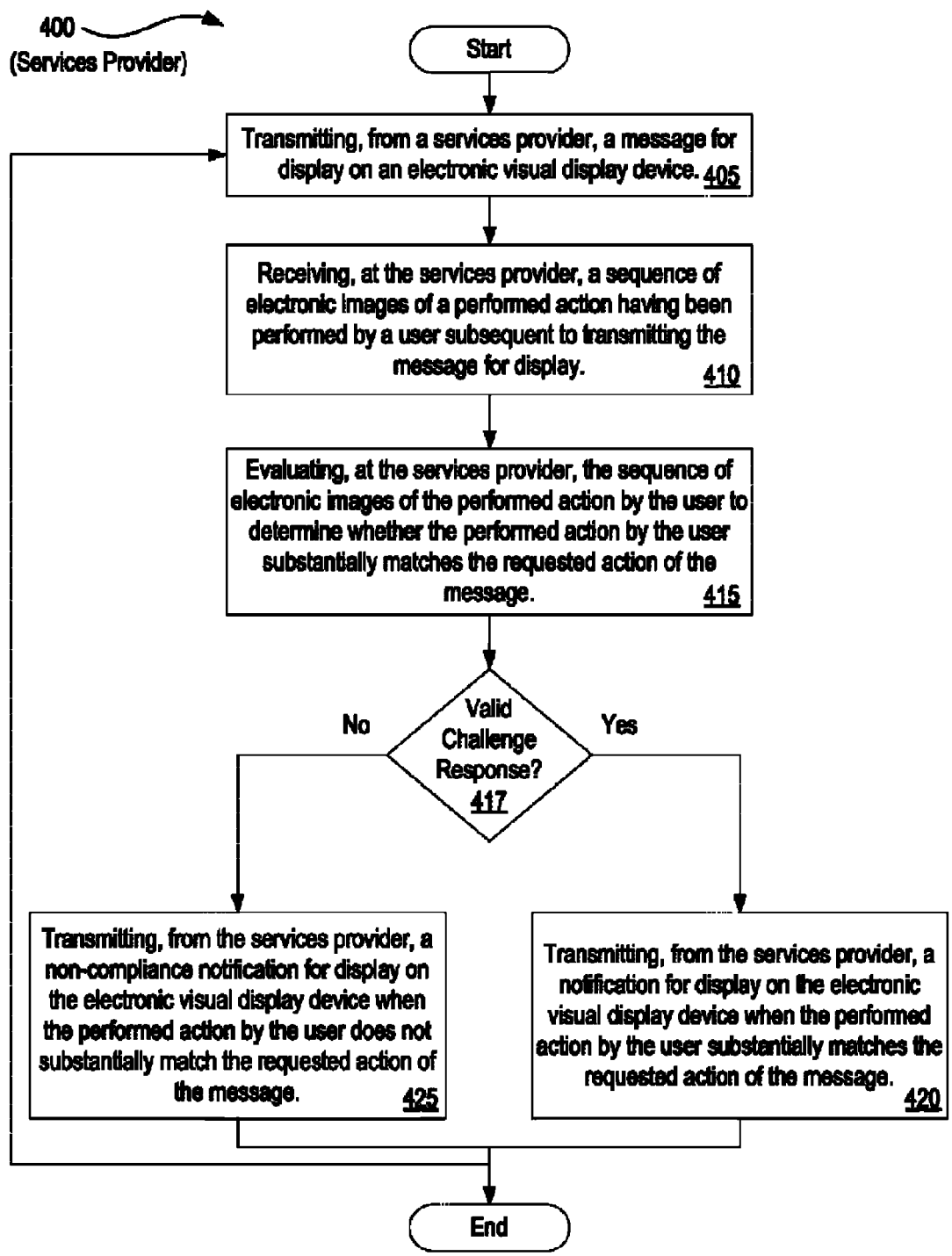

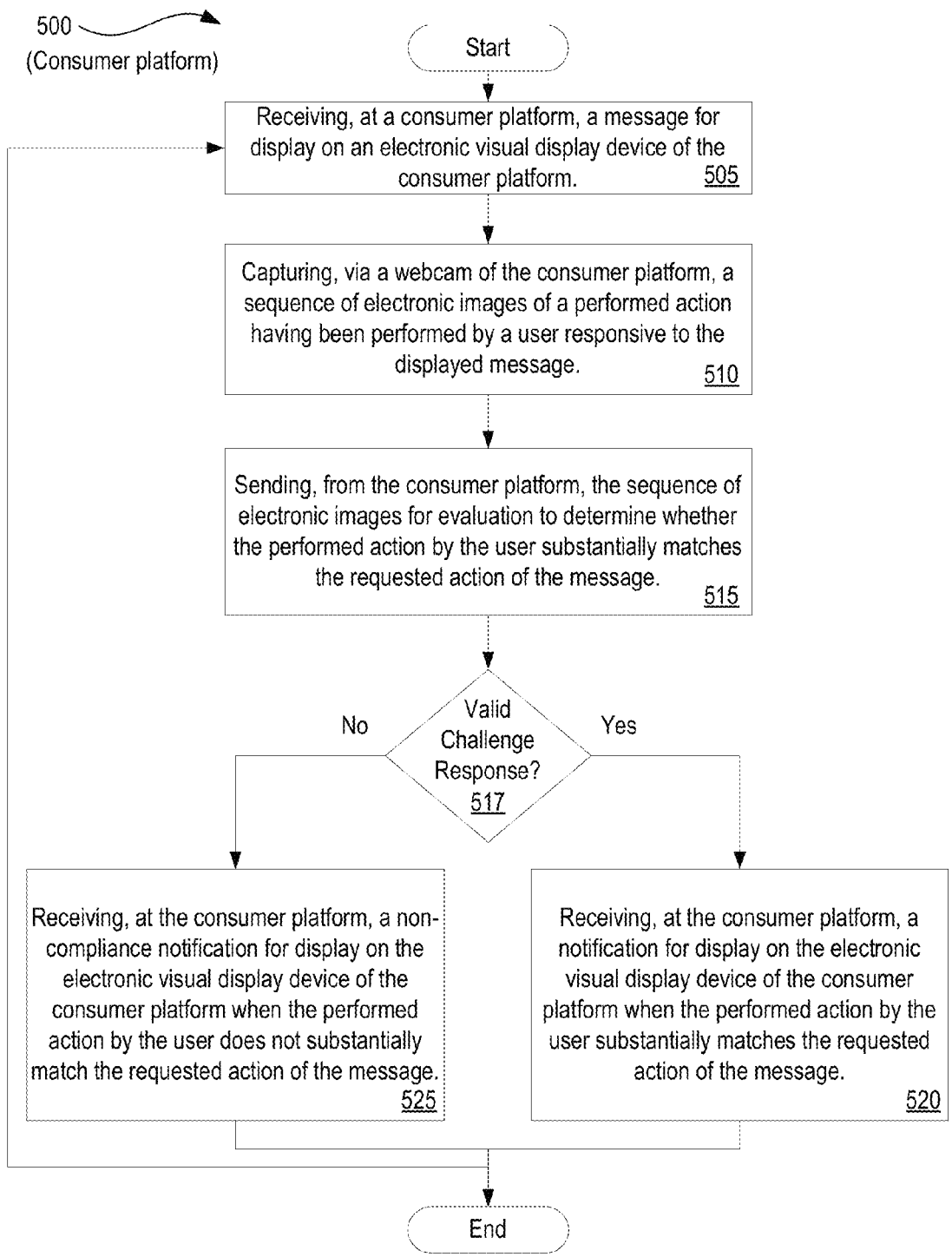

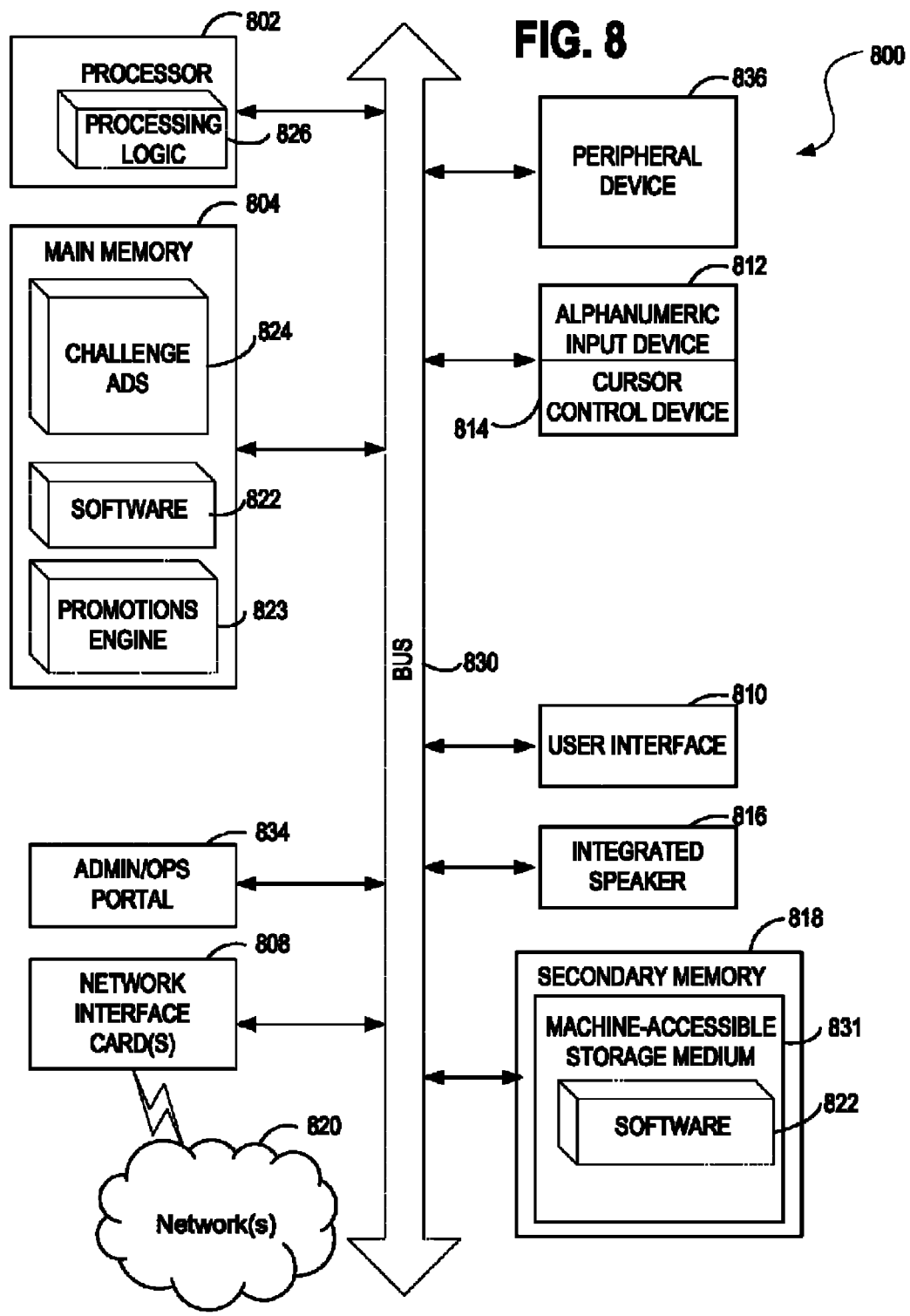

INTERACTIVE VISUAL ADVERTISEMENT SERVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems, apparatuses, and methods for implementing an interactive visual advertisement service.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

With the rise of the modern "Internet," and the increased commercial activity which takes place on the Internet, it is not at all surprising that advertising dollars have flowed into Internet advertising campaigns in an effort to exploit the platform and gain the attention and patronage of its users.

In recent years, however, unfavorable trends have been developing for advertisers of such campaigns which threaten to undermine the value of their investment. For instance, as users become increasingly accustomed to seeing online advertisements, users have developed what is sometimes referred to as "ad blindness," a phenomenon in which ads are presented to users, but are ignored at increasing rates as users have developed what is essentially a mental filter to them.

Other problems have arisen also, such as online advertisement fraud, sometimes referred to as "click fraud," which is the use of computer programs and "bots" to programmatically "click" on advertisements to generate revenue for a website displaying such ads, while returning no value whatsoever to the advertisers paying for the display of such ads.

Yet another issue threatening the value to be obtained by online advertisers is the recent trend of per-click costing or "Cost Per Click (CPC)" costs increasing contemporaneously with decreasing rates of users clicking on displayed ads or "Click Through Rate (CTR)."

This confluence of trends reflecting user behavior and the economic models of online advertising threatens to undermine much of the incentive for investing in Internet advertising, to the determinant of purveyors of products, services, and content offerings, as well as to users who benefit from the subsidy provided through advertising and those entities who facilitate the distribution of advertisements through their respective channels.

The present state of the art may therefore benefit from the systems, apparatuses, and methods for implementing an interactive visual advertisement service as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2 illustrates an exemplary construct of challenge advertisement consumption in accordance with which embodiments may operate;

FIG. 3A illustrates exemplary entities and interactions in accordance with which embodiments may operate;

FIGS. 4 and 5 are flow diagrams illustrating methods for implementing an interactive visual advertisement service;

FIG. 8 illustrates a diagrammatic representation of a machine in the exemplary form of a computer system, in accordance with one embodiment.

DETAILED DESCRIPTION

Figure 1:
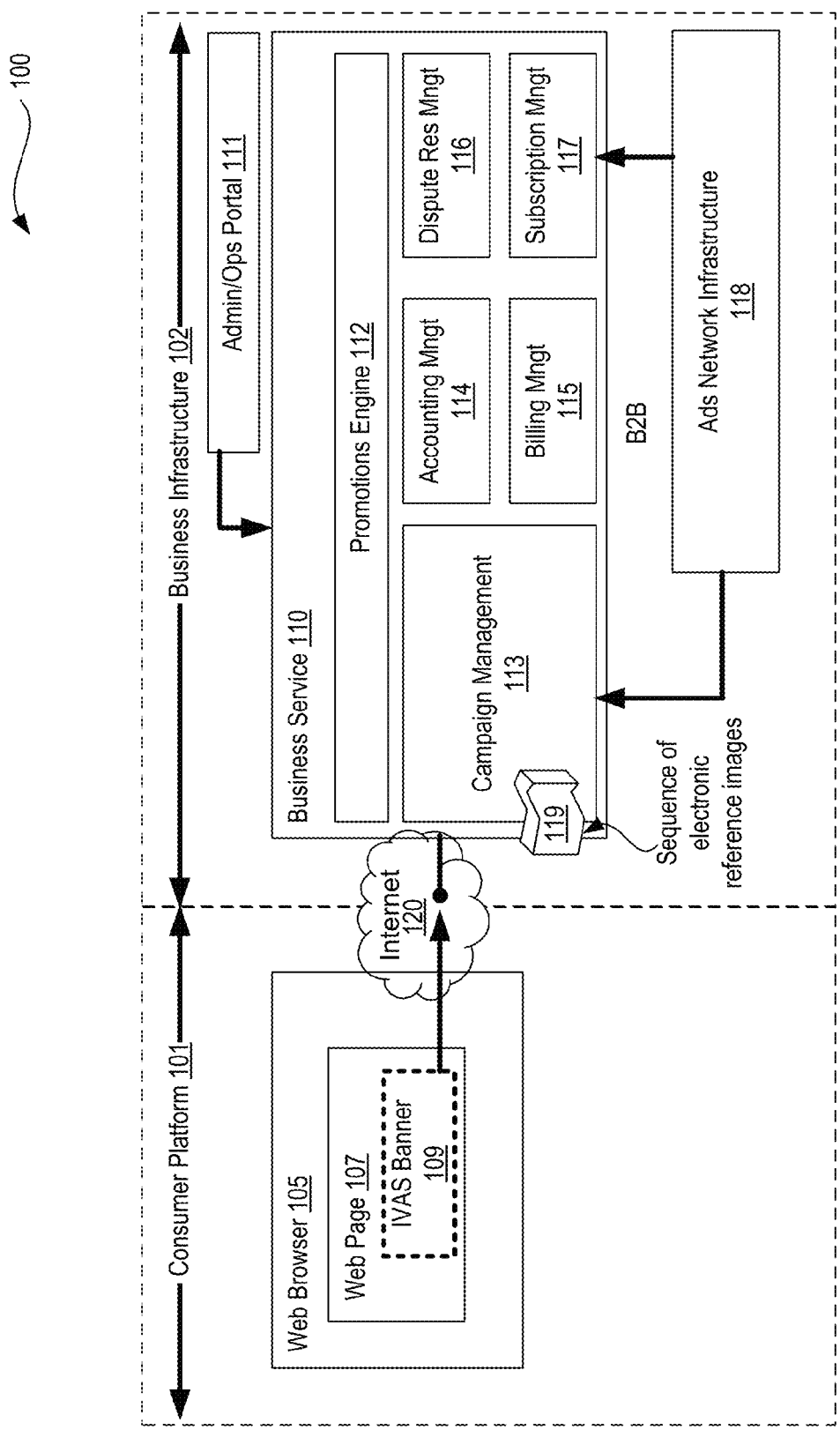
FIG. 1 illustrates an exemplary architecture in accordance with which embodiments may operate.

Described herein are systems, apparatuses, and methods for implementing an interactive visual advertisement service. For example, in one embodiment, such means may include means for transmitting a message for display on an electronic visual display device in which the message includes a requested action to be performed by a user; means for receiving a sequence of electronic images of a performed action having been performed by the user subsequent to transmitting the message for display; means for evaluating the sequence of electronic images of the performed action by the user to determine whether the performed action by the user substantially matches the requested action of the message; and means for transmitting a notification for display on the electronic visual display device when the performed action by the user substantially matches the requested action of the message.

The implementation of interactive visual advertisement services may utilize technologies including challenge advertisements ("ads"), computer vision, customizable ads, reusable ads, rich media ads, online advertisement, rich media advertisement, "Advergames" (e.g., combined advertisements and games), and object or gesture recognition. Through the user of an "Interactive Visual Advertisement Service" (IVAS), webcam input and object recognition technology is coordinated in such a way as to facilitate the distribution of, and capturing of user responses to, interactive ads that involve real life challenges (so called "challenge ads") which are designed to result in a higher CTR or Click Through Rate, thus improving the value to advertisers and ad distributors alike. The IVAS service further enables lower setup costs and is less prone to click fraud due to the increased interactivity requirement of a user. For instance, rather than merely allowing a bot to "click" on an advertisement displayed on a website as if the bot were an actual user, the bot would be required to additionally perform a requested action specified through the IVAS service, a task which though not impossible, would be much more technologically complex for a bot to adequately perform, thus increasing the cost of implementing a fraud and reducing the financial incentive for doing so. Thus, through the implementation of such an IVAS service, an easier setup and increased flexibility of online text ads is realized but with the interactivity and engagement level of an advergame (e.g., an advertisement game).

Conventional means provide no mechanism by which to display an advertisement to a user in which an action is requested to be performed by the user which is then evaluated to determine whether or not the user's performed action substantially matches the requested action. Although static text advertisements and rich media advertisements exist, there remains no mechanism through which user action performed responsive to rendered advertisements is subjected to assessment and evaluation as a condition to providing a redemption link, prize coupon, discount, or other reward.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an exemplary architecture 100 in accordance with which embodiments may operate. Depicted are both consumer platform 101 and business infrastructure 102 connected by Internet 120, the consumer platform 101 reflecting a user's side or a user's location and the business infrastructure 102 reflecting the structure and components for implementing the interactive visual advertisement service or IVAS.

At the consumer platform 101 side is web browser 105, web page 107, and the IVAS banner 109. At the business infrastructure 102 side is an administrative and operations portal 111 which connects with business service 110. Business service 110 includes several components including the promotions engine 112, campaign management 113, accounting management 114, billing management 115, dispute resolution management 116, and subscription management 117 components. Further depicted is the advertisement infrastructure 118 which is connected with the campaign management 113 component and the subscription management 117 component, each being components of the business service 110.

In accordance with the described embodiments, on the client side within the consumer platform 101 is the IVAS banner which renders customized campaigns which are retrieved from the business backend side within the business infrastructure 102. The IVAS banner may further be responsible for the capturing of images through a webcam at an end user device and sending such images or sequences of images to the backend side at business infrastructure 102, for example, to be processed by the promotions engine 112.

At the business backend within business infrastructure 102 is the promotions engine 112 which is responsible for determining the result of a challenge, such as that presented by an advertisement challenge. The promotions engine 112 makes such a determination by evaluating the images that are received from the IVAS banners in order to find matches depending on campaign configuration submitted by the Advertiser. For instance, an assessment can be made whether a requested action to be performed by the user matches or falls within the criteria to be evaluated as affirmatively matching a performed action by a user which is captured by the user's computing device and returned the promotions engine 112 for evaluation.

The campaign management 113 component is responsible for serving the IVAS banners as required by ad network client code placed into a publisher's web page, for instance, code at web page 107 may request, pull, or otherwise be configured to display the appropriate IVAS banner 109 or banners, as served and distributed through the campaign management 113 component. The campaign management 113 component may further provide the requisite infrastructure for advertisers to setup, configure, and establish their online advertising campaigns, including images, patterns, and collaterals, via the administrative and operations portal 111.

Such components operate cooperatively with the accounting management 114 component, the billing management 115 component, the dispute resolution management 116 component and the subscription management 117 component provided by business service 110.

According to one embodiment, advertisers enter their challenge advertisements and collateral through the administrative and operations portal 111 to establish the criteria and confines of images for object recognition, challenge text, prize redemption links, and so forth. Publishers and distributors of the challenge advertisements include appropriately configured advertising network code into websites within their control in order to render the challenge advertisements to users.

In one embodiment, an object or gesture recognition algorithm or equivalent software or functionality is used to evaluate a user's performed action. In a related embodiment, an advertiser provides a sequence of electronic reference images 119 from which reference objectives may be established using the same object or gesture recognition algorithm, software, or functionality, to which the user's performed action as captured within an electronic sequence of images returned from an image capture device at a consumer platform may be compared and analyzed for a match or for matching criteria.

FIG. 2 illustrates an exemplary construct of challenge advertisement consumption 200 in accordance with which embodiments may operate. In accordance with one embodiment, consumers navigate to a publisher's website or web page 107 which has displayed thereupon a challenge advertisement such as the IVAS banner 109 depicted within web page 107.

From left to right the direction of time and event sequences is depicted, that is to say, each block occurs in time from left to right. At the second block, the IVAS banner 109 is depicted as "loading" and the message 214 to be displayed is depicted as having a requested action therein to be performed by a user. The IVAS banner 109 or challenge advertisement may be enabled via, for example, Adobe Flash object technology, or other appropriate means. Proceeding to the next block, element 217 indicates the message 214 is transmitted for display and within the exemplary block, the IVAS banner 109 depicts an image or sequence of images of a user within a field of view of a webcam 212 at a user's computing device and at element 215, the message 214 is displayed to the user for viewing in which the message includes the requested action to be performed by the user. Further depicted is an optional clock display 216, for example, capable to indicate a limited amount of time available to the user to perform the requested action included with the message 214.

At the next block sequence, the IVAS banner 109 and the user within the field of view of the webcam 212 remains as does the displayed message 214 with the requested action to be performed by the user at element 215, and the optional clock display 216. Additionally shown is an object and/or a determinable action 225 within the field of view of the webcam 212. Element 218 indicates the receiving of a sequence of electronic images from the webcam; for example, such a sequence of images having captured the object and/or determinable action 225 of the user within the field of view of the webcam 212. According to element 219, the sequence of images are then evaluated and proceeding to the next and final block shown, element 220 indicates the transmission of a notification of match and the notification of match 226 is shown within the IVAS banner 109 for viewing by the user. An optional redemption link 227 is additionally shown, for example, enabling the user to retrieve or claim a reward, discount, coupon, or navigate to another webpage, etc.

When a user or a consumer performs the requested action according to the message 214 and the displayed IVAS banner 109, a sequence of electronic images are returned from the consumer platform 101 side to the business infrastructure 102 side as discussed at FIG. 1. The sequence of images is then evaluated by the promotions engine 112 so as to determine whether the performed action by the user substantially matches the requested action of the message 214. The user or consumer is then redirected via the redemption link 227 to a redemption page or some other page depending on the result of the challenge. For example, a different redirection may occur where the user's performed action is evaluated to be non-compliant (e.g., does not substantially match) the requested action set forth by the message 214.

Such a model provides significant advantages over conventional online advertising models. For instance, conventional mechanisms providing only static text ads are inexpensive to set up, but are prone to click fraud and also subject to ad blindness. Rich media ads and advertising games are more engaging and less prone to click fraud, but are very expensive to develop and deploy and further tend to not to be reusable, thus undermining their return on investment to potential advertisers.

The IVAS banner 109 which facilitates the interactive visual advertisement service as described above overcomes the drawbacks of both static text ads and also rich media ads by offering less expense and greater flexibility in developing and deployment of the IVAS banner 109 advertisements by allowing the configuration and setup of an IVAS compatible advertisement through only the completion of a form accessible through the administrative and operations portal 111 depicted at FIG. 1. In certain embodiments, an IVAS banner 109 is configured and deployed without having to develop software for flash animation as would be the case with rich media ads and advergame type deployments.

Notwithstanding these lower barriers for development and deployment of an IVAS banner 109 compatible advertisement, the IVAS banner 109 when consumed by a user still provides an experience as entertaining as a rich media ad and the challenge advertisement is more compelling than static text ads because they challenge users to engage in real life activities with real life objects in fulfillment of performing the requested action 215, thus engaging the user's conscience attention to an extent similar to a game but without the development overhead to create such a game.

Click fraud is drastically reduced, if not wholly eliminated, because the challenge evaluation and processing occurs on the business infrastructure 102 side (see FIG. 1) which is more involved than merely determining that a click event occurred within a defined space, and further because the level of required interaction between the user and the user's webcam 212 is far more complicated than simply evaluating a click event or a rest over event, each of which are easily mimicked by programmatic bots thus subjecting conventional non-IVAS type advertisements to simplistic but lucrative click fraud.

The extent of user interaction required by the IVAS banner 109 advertisement and specifically the requested action to be performed by the user 215 is technologically feasible but is so complex to mimic that would be fraudsters are presented with an inadequate financial return to develop the necessary technology.

Further still, because real life objects and/or determinable actions 225 are called for as part of the advertisement experience mandated by an IVAS banner 109 compatible advertisement, standardized object recognition and gesture recognition algorithms and technology may be leveraged to conduct the requisite assessment, evaluation, and determination operations on the sequence of electronic images received from the user's webcam, yet a very high burden remains on any would be fraudster attempting to programmatically replicate requested actions (e.g., via a "bot") whereas a human user possesses the inherent and ready ability to perform such requested actions.

FIG. 3A illustrates exemplary entities and interactions 300 in accordance with which embodiments may operate. For instance, entities depicted include the services provider 305 having business service 110 and services 306 depicted therein; an ads network 320 entity, an advertiser 330 entity, a consumer platform 101, and a publisher 325.

Depicted amongst the various entities are exemplary interactions and relationships. As shown, services provider 305 provides challenge verification services 355 and interactive visual advertisement technology 356 to the ads network 320 which in return provides commissions 354 back to the services provider. Publisher 325 enables use of a distribution channel 359 in return for commissions 353 to the publisher from the ads network 320 and the publisher 325 provides content 351 to the consumer platform 101.

The advertiser 330 in turn provides prizes, coupons, discounts, rewards, and incentives 352 to the consumer platform as well as providing advertising campaign funds 357 to the advertising network 320, and based on such a relationship the advertiser 330 enjoys improved Click Through Rates (CTR) attained 358 through utilization of such a structure.

Figure 3B:
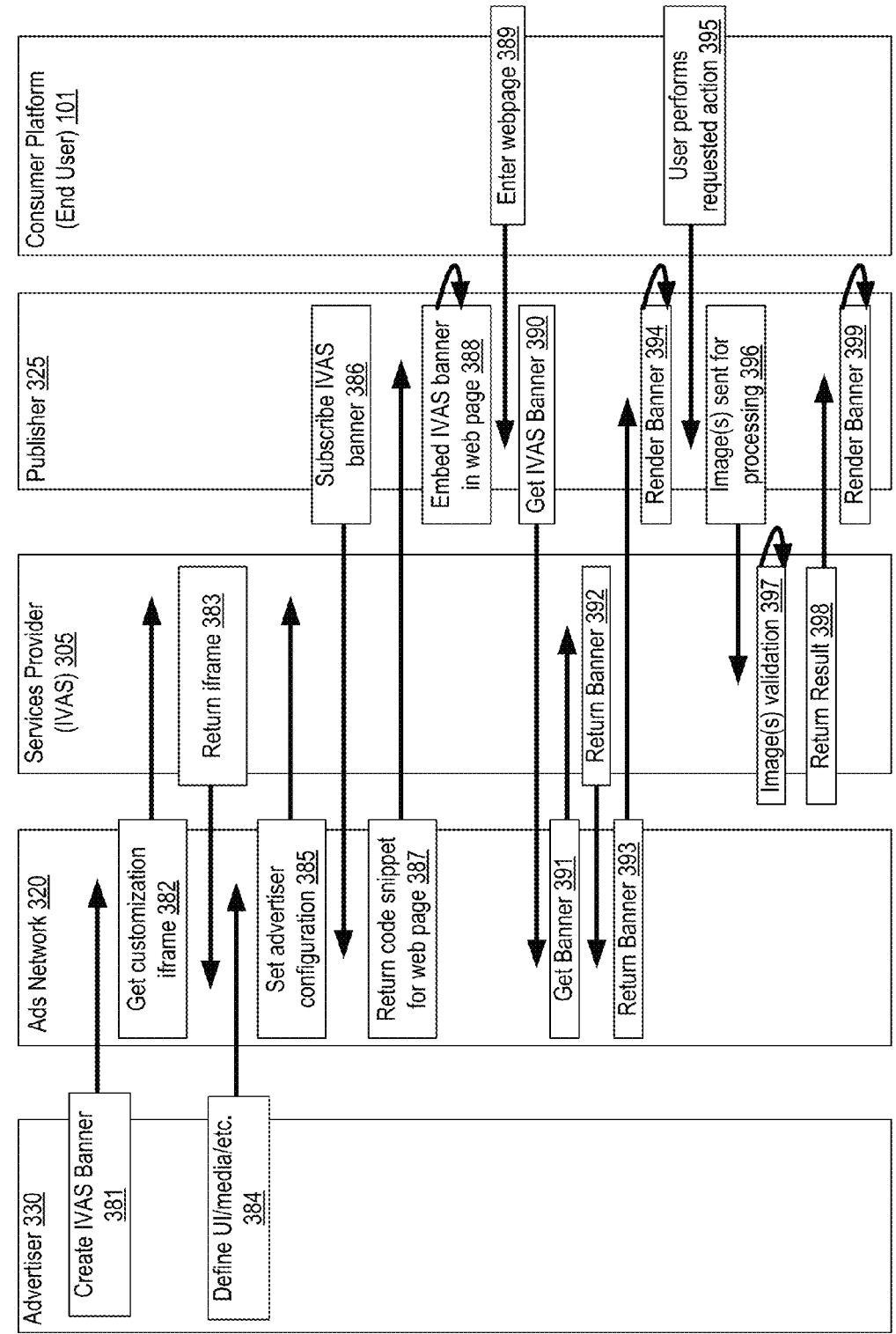
FIG. 3B illustrates an exemplary flow in accordance with which embodiments may operate.

FIG. 3B illustrates an exemplary flow 301 in accordance with which embodiments may operate. Each of the entities set forth at FIG. 3A are again depicted, including advertiser 330, ads network 320, services provider 305 (e.g., an IVAS services provider), publisher 325, and consumer platform 101 (e.g., an end user computing device). Here interactions 381 through 399 are depicted amongst the entities so as to illustrate the various roles and relationships among them.

Beginning with advertiser 330, at interaction 381, an IVAS banner is created and provided to ads network 320. Ads network 320 gets a customization iframe 382 from services provider 305 which returns the iframe at 383 to ads network 320. Advertiser 330 defines the UI (User Interface) and media, etc., at interaction 384 with ads network 320 and ads network 320 sets the advertiser configuration at interaction 385 with services provider 305. Publisher 325 subscribes to the IVAS banner at interaction 386 with ads network 320 and ads network 320 returns a code snippet for a webpage at interaction 387 to publisher 325 which then embeds the IVAS banner in a webpage at interaction 388.

With reference to consumer platform 101, a user navigates to or enters a webpage at interaction 389 with the publisher 325 causing publisher 325 to get the IVAS banner from the ads network 320 at interaction 390. Ads network 320 gets the IVAS banner from the services provider 305 at interaction 391 causing services provider 305 to return the IVAS banner at interaction 392 to the ads network 320 which then returns the IVAS banner to the publisher 325 at interaction 393.

Publisher 325 renders the IVAS banner at interaction 394 (e.g., displays the IVAS banner to a user at a user's computing device) responsive to which the user performs the requested action at the consumer platform 101 at interaction 395 with publisher 325 and at interaction 396 the images are sent for processing from publisher 325 to the services provider 305. The services provider 305 receives the image or a sequence of electronic images for image(s) validation at interaction 397 and the services provider 305 returns the results of the image validation to the publisher 325 at interaction 398 subsequent to which the publisher 325 then renders the IVAS banner at interaction 399, thus causing the presentment of an appropriate notification to the user at the consumer platform 101, such as yielding an incentive, reward, discount, coupon, redemption link for such incentives, etc.

In such a way, implementation of an interactive visual advertisement service may be realized in accordance with the described embodiments.

FIGS. 4 and 5 are flow diagrams illustrating methods 400 and 500 respectively, for implementing an interactive visual advertisement service. Methods 400 and 500 may be performed by processing logic that may include hardware (e.g., circuitry, dedicated logic, programmable logic, microcode, etc.), including that of a client or consumer platform, a services provider, an ads network entity or entities, an advertiser, or a publisher as previously described. The numbering of the blocks presented is for the sake of clarity and is not intended to prescribe an order of operations in which the various blocks must occur.

Method 400 begins with processing logic for transmitting, from a services provider, a message for display on an electronic visual display device (block 405).

At block 410, processing logic receives, at the services provider, a sequence of electronic images of a performed action having been performed by a user subsequent to transmitting the message for display.

At block 415, processing logic evaluates, at the services provider, the sequence of electronic images of the performed action by the user to determine whether the performed action by the user substantially matches the requested action of the message.

At decision point 417, a determination is made as to whether or not there is a valid challenge response from the user's computing device in accordance with the message requesting the requested action to be performed by the user. If yes, the response is valid based upon the evaluation of block 415, then flow proceeds from decision point 417 to block 420 where processing logic at the services provider transmits a notification for display on the electronic visual display device when the performed action by the user substantially matches the requested action of the message. Conversely, if no, the challenge response is not valid, then flow instead proceeds from decision point 417 to block 425 where processing logic at the services provider transmits a non-compliance notification for display on the electronic visual display device when the performed action by the user does not substantially match the requested action of the message. For example, an alternate notification may be provided that is different and possibly less valuable to the user, such as a lesser discount, a lesser prize, lesser incentive, or simply no incentive, discount, or prize whatsoever. Alternatively, a non-compliance notification may simply request the user to re-try the challenge or to attempt a different challenge advertisement in pursuit of the potential incentive.

Flow then proceeds to end or repeats as necessary.

In accordance with one embodiment, there is a non-transitory computer readable storage medium having instructions stored thereon that, when executed by a processor of a service provider, the instructions cause the service provider to perform operations including: transmitting a message for display on an electronic visual display device in which the message includes a requested action to be performed by a user; receiving a sequence of electronic images of a performed action having been performed by the user subsequent to transmitting the message for display; evaluating the sequence of electronic images of the performed action by the user to determine whether the performed action by the user substantially matches the requested action of the message; and transmitting a notification for display on the electronic visual display device when the performed action by the user substantially matches the requested action of the message.

Method 500 begins with processing logic for receiving, at a consumer platform, a message for display on an electronic visual display device of the consumer platform (block 505). Such a consumer platform may be a smartphone, tablet computing device, a touch screen type computing device, or other capable computing device such as a personal computer, user terminal, laptop, etc.

At block 510, processing logic captures, via a webcam of the consumer platform, a sequence of electronic images of a performed action having been performed by a user responsive to the displayed message.

At block 515, processing logic sends, from the consumer platform, the sequence of electronic images for evaluation to determine whether the performed action by the user substantially matches the requested action of the message.

At decision point 517, a determination is made as to whether or not there is a valid challenge response from the consumer platform (e.g., a user's computing device) in accordance with the message requesting the requested action to be performed by the user. If yes, the response is valid based upon the evaluation of block 515, then flow proceeds from decision point 517 to block 520 where processing logic receives, at the consumer platform, a notification for display on the electronic visual display device of the consumer platform when the performed action by the user substantially matches the requested action of the message. Conversely, if no, the challenge response is not valid, then flow instead proceeds from decision point 517 to block 525 where processing logic receives, at the consumer platform, a non-compliance notification for display on the electronic visual display device of the consumer platform when the performed action by the user does not substantially match the requested action of the message.

Flow then proceeds to end or repeats as necessary.

In accordance with one embodiment, there is a non-transitory computer readable storage medium having instructions stored thereon that, when executed by a processor of a consumer platform (e.g., a client computing device such as a laptop, desktop, server, tablet computing device or a hand-held smartphone), the instructions cause the consumer platform to perform operations including: receiving a message for display on an electronic visual display device of the consumer platform in which the message includes a requested action to be performed by a user; capturing, via a webcam of the consumer platform, a sequence of electronic images of a performed action having been performed by a user responsive to the displayed message; sending the sequence of electronic images for evaluation to determine whether the performed action by the user substantially matches the requested action of the message; and receiving a notification for display on the electronic visual display device of the consumer platform when the performed action by the user substantially matches the requested action of the message.

Figure 6:
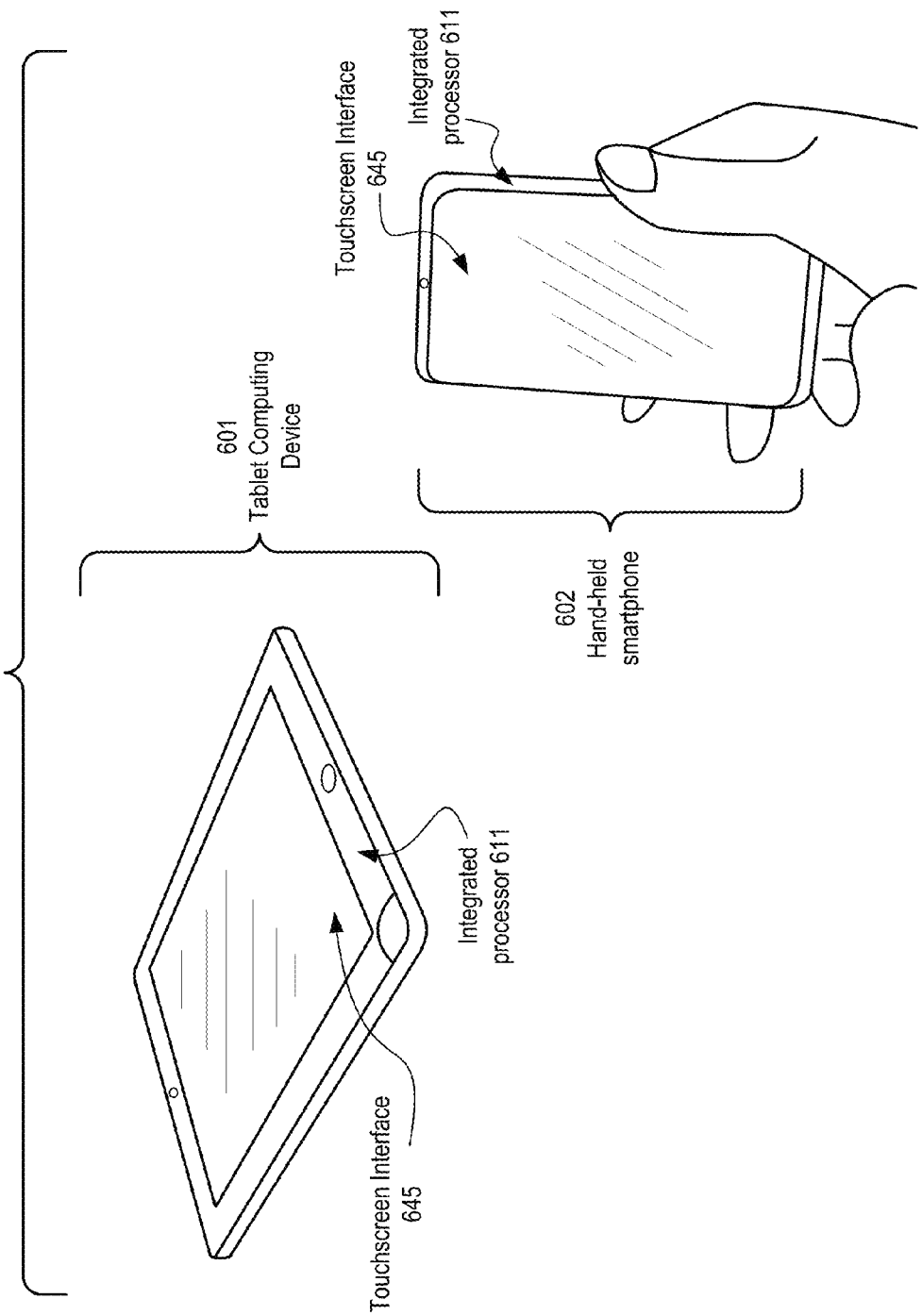
FIG. 6 depicts a tablet computing device and a hand-held smartphone each having a circuitry, components, and functionality integrated therein as described in accordance with the embodiments.

FIG. 6 depicts a tablet computing device 601 and a hand-held smartphone 602 each having a circuitry, components, and functionality integrated therein as described in accordance with the embodiments, such as a webcam for capturing the sequence of electronic images of a user performing a requested action, an interface and complementary transmitter for returning the captured sequence of images, and compatible web browser software for interfacing to the interactive visual advertisement service as described herein. Each of the tablet computing device 601 and the hand-held smartphone 602 constitute exemplary consumer platforms 600 capable to interact with the described interactive visual advertisement service on behalf of a user or consumer.

As depicted, each of the tablet computing device 601 and the hand-held smartphone 602 include a touchscreen interface 645 and an integrated processor 611 in accordance with disclosed embodiments.

For example, in one embodiment, the client side consumer platform 101 depicted by the preceding figures may be embodied by a tablet computing device 601 or a hand-held smartphone 602, in which a display unit of the apparatus includes the touchscreen interface 645 for the tablet or smartphone and further in which memory and an integrated circuit operating as an integrated processor 611 are incorporated into the tablet or smartphone. In such an embodiment, the integrated processor 611 executes a web browser capable to display web pages and render or display the IVAS banner 109 as previously described.

Figure 7:
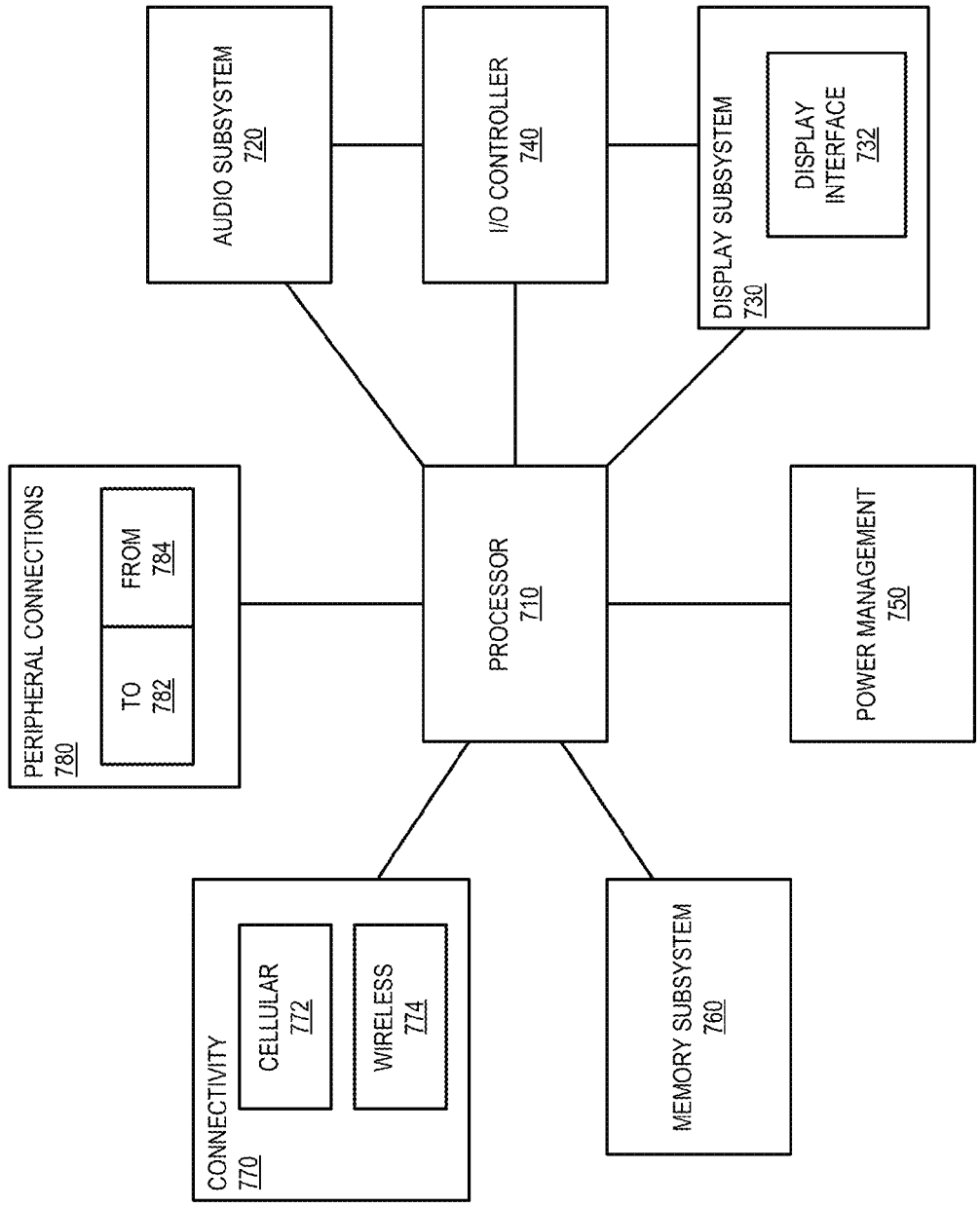
FIG. 7 is a block diagram of an embodiment of a tablet computing device, a smart phone, or other mobile device in which touchscreen interface connectors are used.

FIG. 7 is a block diagram 700 of an embodiment of a tablet computing device, a smart phone, or other mobile device in which touchscreen interface connectors are used. Processor 710 performs the primary processing operations. Audio subsystem 720 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 710.

Display subsystem 730 represents hardware (e.g., display devices) and software (e.g., drivers) components that provide a visual and/or tactile display for a user to interact with the tablet computing device or smart phone. Display subsystem 730 includes display interface 732, which includes the particular screen or hardware device used to provide a display to a user. In one embodiment, display subsystem 730 includes a touchscreen device that provides both output and input to a user.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to the tablet computing device or smart phone through which a user might interact. In one embodiment, I/O controller 740 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 750 that manages battery power usage, charging of the battery, and features related to power saving operation. Memory subsystem 760 includes memory devices for storing information in the tablet computing device or smart phone. Connectivity 770 includes hardware devices (e.g., wireless and/or wired connectors and communication hardware) and software components (e.g., drivers, protocol stacks) to the tablet computing device or smart phone to communicate with external devices. Cellular connectivity 772 may include, for example, wireless carriers such as GSM (global system for mobile communications), CDMA (code division multiple access), TDM (time division multiplexing), or other cellular service standards). Wireless connectivity 774 may include, for example, activity that is not cellular, such as personal area networks (e.g., Bluetooth), local area networks (e.g., WiFi), and/or wide area networks (e.g., WiMax), or other wireless communication.

Peripheral connections 780 include hardware interfaces and connectors, as well as software components (e.g., drivers, protocol stacks) to make peripheral connections as a peripheral device ("to" 782) to other computing devices, as well as have peripheral devices ("from" 784) connected to the tablet computing device or smart phone, including, for example, a "docking" connector to connect with other computing devices. Peripheral connections 780 include common or standards-based connectors, such as a Universal Serial Bus (USB) connector, DisplayPort including MiniDisplayPort (MDP), High Definition Multimedia Interface (HDMI), Firewire, etc.

FIG. 8 illustrates a diagrammatic representation of a machine 800 in the exemplary form of a computer system, in accordance with one embodiment, within which a set of instructions, for causing the machine 800 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and persistent data base implementations), which communicate with each other via a bus 830. Main memory 804 includes information and instructions and software program components necessary for performing and executing the functions with respect to the various embodiments of the systems, methods, and entities as described herein including the client, publisher, ad network, advertiser, consumer platform, and the services provider. Challenge Advertisements 824 are defined by advertisers for rendering to a computer platform and may be stored within main memory 804. Promotions engine 823 may be stored within main memory 804 for later execution by an appropriate entity. Main memory 804 and its sub-elements (e.g. 823 and 824) are operable in conjunction with processing logic 826 and/or software 822 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include one or more network interface cards 808 to communicatively interface the computer system 800 with one or more networks 820, such as the Internet or a publicly accessible network. The computer system 800 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.). Administrative and operations portal 834 may optionally be integrated into the exemplary machine 800.

The secondary memory 818 may include a non-transitory machine-readable storage medium (or more specifically a non-transitory machine-accessible storage medium) 831 on which is stored one or more sets of instructions (e.g., software 822) embodying any one or more of the methodologies or functions described herein. Software 822 may also reside, or alternatively reside within main memory 804, and may further reside completely or at least partially within the processor 802 during execution thereof by the computer system 800, the main memory 804 and the processor 802 also constituting machine-readable storage media. The software 822 may further be transmitted or received over a network 820 via the network interface card 808.

In accordance with the preceding disclosure, the following exemplary embodiments are presented as follows:

According to a first embodiment there is a method having the following operations: transmitting a message for display on an electronic visual display device, wherein the message includes a requested action to be performed by a user; receiving a sequence of electronic images of a performed action having been performed by the user subsequent to transmitting the message for display; evaluating the sequence of electronic images of the performed action by the user to determine whether the performed action by the user substantially matches the requested action of the message; and transmitting a notification for display on the electronic visual display device when the performed action by the user substantially matches the requested action of the message.

An embodiment of the method, wherein the message includes the requested action to be performed by the user includes at least one of: the requested action of the message requesting the user to perform the requested action upon an object; the requested action of the message requesting the user to perform the requested action using the object; the requested action of the message requesting the user to perform the requested action in proximity of the object, wherein the proximity of the object is within a field of view captured by the sequence of electronic images; and the requested action of the message requesting the user to perform the requested action using gestures and/or movements of the user's body.

An embodiment of the method, wherein evaluating the sequence of electronic images of the performed action by the user to determine whether the performed action by the user substantially matches the requested action of the message includes: comparing the sequence of electronic images of the performed action by the user to a sequence of electronic images of the requested action to be performed by the user.

An embodiment of the method, further including: comparing the sequence of electronic images of the performed action by the user to a sequence of electronic images of the requested action to be performed by the user includes: processing an object or gesture recognition algorithm to recognize both: a) an object or gesture in the sequence of electronic images of the requested action to be performed by the user; and b) the performed action by the user as determined from the sequence of electronic images.

An embodiment of the method, further including: receiving a sequence of electronic reference images from an advertiser, the sequence of electronic reference images depicting the requested action to be performed by the user to be compared with the sequence of electronic images of the action by the user.

An embodiment of the method, further including: receiving a sequence of electronic reference images; establishing one or more reference objectives by processing the sequence of electronic reference images through object or gesture recognition software; and wherein evaluating the sequence of electronic images of the performed action by the user to determine whether the performed action by the user substantially matches the requested action of the message includes processing the sequence of electronic images of the performed action by the user via the object or gesture recognition software to determine if the performed action by the user matches any of the one or more reference objectives established.

An embodiment of the method, further including: receiving the message for display from an advertiser, wherein the message for display is to be rendered to the user via a consumer platform.

An embodiment of the method, further including: displaying the message on the electronic visual display device via a consumer platform accessible to the user.

An embodiment of the method, wherein receiving a sequence of electronic images of a performed action having been performed by the user subsequent to transmitting the message for display includes: capturing the performed action by the user in the sequence of electronic images via a camera proximate the user.

An embodiment of the method, wherein transmitting a notification for display on the electronic visual display device when the performed action by the user substantially matches the requested action of the message includes at least one of: transmitting an invitation to obtain instructions to redeem a reward; transmitting a redemption link to the consumer platform; transmitting a coupon to the consumer platform; activating a discount for products or services to the consumer platform and redeemable from the consumer platform; and crediting points to a loyalty program associated with products or services which are accessible via the consumer platform.

An embodiment of the method, wherein transmitting a message for display on an electronic visual display device includes: transmitting an advertisement to a consumer platform, wherein the advertisement includes at least the following components: a) an image, mark, graphic, or logo supplied by an advertiser for inclusion with the advertisement; b) text prescribing a challenge to be performed by a user of the consumer platform in exchange for an incentive, reward, discount, or incentive provided by the advertiser; and c) a display frame streaming the sequence of electronic images being captured by a webcam at the consumer platform.

An embodiment of the method, wherein the advertisement further includes a clock display having a decrementing countdown of available time for the user to meet the challenge prescribed.

An embodiment of the method, wherein the message for display includes a challenge advertisement for display within an Interactive Visual Advertisement Service (IVAS) banner.

An embodiment of the method, wherein the method further includes: receiving one or more images of a trademark, image, graphic, or logo associated with an advertiser; and wherein evaluating the sequence of electronic images of the performed action by the user to determine whether the performed action by the user substantially matches the requested action of the message includes: evaluating the sequence of electronic images of the performed action by the user for the presence of an object having thereupon the trademark, image, graphic, or logo received.

An embodiment of the method, wherein at least one machine readable medium including a plurality of instructions that in response to being executed on a computing device, cause the computing device to carry out any variant of the preceding description of said method.

According to one embodiment, there is at least one non-transitory machine readable medium having instructions stored thereon that, when executed by a processor in a computing device, the instructions cause the computing device to perform operations including: transmitting a message for display on an electronic visual display device, wherein the message includes a requested action to be performed by a user; receiving a sequence of electronic images of a performed action having been performed by the user subsequent to transmitting the message for display; evaluating the sequence of electronic images of the performed action by the user to determine whether the performed action by the user substantially matches the requested action of the message; and transmitting a notification for display on the electronic visual display device when the performed action by the user substantially matches the requested action of the message.

In another embodiment of the at least one non-transitory machine readable medium the message having the requested action to be performed by the user includes at least one of: the requested action of the message requesting the user to perform the requested action upon an object; the requested action of the message requesting the user to perform the requested action using the object; the requested action of the message requesting the user to perform the requested action in proximity of the object, wherein the proximity of the object is within a field of view captured by the sequence of electronic images; and the requested action of the message requesting the user to perform the requested action using gestures and/or movements of the user's body.

In another embodiment of the at least one non-transitory machine readable medium, evaluating the sequence of electronic images of the performed action by the user to determine whether the performed action by the user substantially matches the requested action of the message includes: comparing the sequence of electronic images of the performed action by the user to a sequence of electronic images of the requested action to be performed by the user.

In another embodiment of the at least one non-transitory machine readable medium, comparing the sequence of electronic images of the performed action by the user to a sequence of electronic images of the requested action to be performed by the user includes: processing an object or gesture recognition algorithm to recognize both: a) an object or gesture in the sequence of electronic images of the requested action to be performed by the user; and b) the performed action by the user as determined from the sequence of electronic images.

According to an alternative embodiment there is a method at a consumer platform, different from the first method, wherein the method includes the following operations: receiving a message for display on an electronic visual display device of the consumer platform, wherein the message includes a requested action to be performed by a user; capturing, via a webcam of the consumer platform, a sequence of electronic images of a performed action having been performed by a user responsive to the displayed message; sending the sequence of electronic images for evaluation to determine whether the performed action by the user substantially matches the requested action of the message; and receiving a notification for display on the electronic visual display device of the consumer platform when the performed action by the user substantially matches the requested action of the message.

An embodiment of the method, wherein sending the sequence of electronic images for evaluation includes sending the sequence of electronic images to a computing device remote from the consumer platform at a different physical location via the Internet.

An embodiment of the method, wherein the consumer platform is embodied by one of: a hand-held smartphone device; a tablet computing device; a personal computer; a laptop; and a kiosk in a supermarket, retail outlet, or publicly accessible venue.

According to another embodiment there is a system including: a message transmitted from the system, the message for display at a consumer platform, wherein the message includes a requested action to be performed by a user in proximity to a web camera of the consumer platform; an interface of the system to receive a sequence of electronic images of a performed action having been performed by the user subsequent to the message having been transmitted to the consumer platform for display; a promotions engine to evaluate the sequence of electronic images of the performed action by the user to determine whether the performed action by the user substantially matches the requested action of the message; and the promotions engine further to transmit a notification for display at the consumer platform when the performed action by the user substantially matches the requested action of the message.

An embodiment of the system, further including: a processor and a memory to execute an object or gesture recognition algorithm to determine whether the performed action by the user substantially matches the requested action of the message.

An embodiment of the system, further including: a non-transitory storage to store a sequence of electronic reference images from an advertiser, the sequence of electronic reference images to be evaluated by the system to establish reference objectives for matching against the received sequence of electronic images to determine whether the performed action by the user substantially matches the requested action of the message.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a consumer platform system accessible to a user, the consumer platform system having at least a processor, a memory, an electronic visual display device, and an image capture device therein, wherein the method comprises:

transmitting a message to the consumer platform system accessible to the user, the message for display on the electronic visual display device of the consumer platform system, wherein the message includes a requested action to be performed by the user using a physical object, and wherein the message further includes one or more images of a trademark or logo associated with an advertiser;

receiving at an interface of the system, a sequence of electronic images of a performed action having been performed by the user using the physical object subsequent to transmitting the message to the consumer platform system for display;

wherein the physical object is an object other than the image capture device which operates as a camera for the consumer platform system;

evaluating the sequence of electronic images of the performed action by the user using the physical object to determine (i) whether the performed action and the physical object within the sequence of electronic images substantially matches the requested action to be performed by the user using the physical object in accordance with the message transmitted and (ii) whether the physical object in the sequence of electronic images includes the trademark or logo associated with the advertiser; and transmitting a notification for display on the electronic visual display device of the consumer platform system when the evaluation of the sequence of electronic images is determined to substantially match the requested action of the message and the physical object in the sequence of electronic images includes the trademark or logo associated with the advertiser, wherein the notification includes information regarding a reward, discount, coupon, or incentive provided by the advertiser.

2. The method of claim 1, wherein evaluating the sequence of electronic images of the performed action by the user to determine whether the performed action by the user substantially matches the requested action of the message comprises:

comparing the sequence of electronic images of the performed action by the user to a sequence of electronic images of the requested action to be performed by the user.

3. The method of claim 2, wherein comparing the sequence of electronic images of the performed action by the user to a sequence of electronic images of the requested action to be performed by the user comprises:

processing an object or gesture recognition algorithm to recognize each of:
a) the physical object or gesture in the sequence of electronic images of the requested action to be performed by the user;
b) the performed action by the user as determined from the sequence of electronic images; and
c) the trademark or logo associated with the advertiser.

4. The method of claim 2, further comprising:

receiving a sequence of electronic reference images from the advertiser, the sequence of electronic reference images depicting the requested action to be performed by the user to be compared with the sequence of electronic images of the action by the user.

5. The method of claim 1, further comprising:
receiving a sequence of electronic reference images;
establishing one or more reference objectives by processing the sequence of electronic reference images through object or gesture recognition software; and
wherein evaluating the sequence of electronic images of the performed action by the user to determine whether the performed action by the user substantially matches the requested action of the message comprises processing the sequence of electronic images of the performed action by the user via the object or gesture recognition software to determine if the performed action by the user matches any of the one or more reference objectives established.

6. The method of claim 1 further comprising:
receiving the message for display from the advertiser, wherein the message for display is to be rendered to the user via a consumer platform system.

7. The method of claim 1 further comprising displaying the message on the electronic visual display device via a consumer platform system accessible to the user.

8. The method of claim 1, wherein receiving a sequence of electronic images of a performed action having been performed by the user subsequent to transmitting the message for display comprises:
capturing the performed action by the user in the sequence of electronic images via the camera proximate the user.

9. The method of claim 1, wherein transmitting a notification for display on the electronic visual display device when the performed action by the user substantially matches the requested action of the message comprises at least one of:
transmitting an invitation to obtain instructions to redeem the reward, discount, coupon, or incentive;
transmitting a redemption link to the consumer platform system;
transmitting the reward, discount, coupon, or incentive to the consumer platform system;
activating the reward, discount, coupon, or incentive for products or services to the consumer platform system and redeemable from the consumer platform system; and
crediting points to a loyalty program associated with products or services which are accessible via the consumer platform system.

10. The method of claim 1, wherein transmitting a message for display on an electronic visual display device comprises:
transmitting an advertisement to a consumer platform system, wherein the advertisement includes at least the following components:
a) the image, mark, graphic, or logo supplied by the advertiser for inclusion with the advertisement;
b) text prescribing a challenge to be performed by the user of the consumer platform system in exchange for the reward, discount, coupon, or incentive provided by the advertiser; and
c) a display frame streaming the sequence of electronic images being captured by a webcam at the consumer platform system.

11. The method of claim 1, wherein the advertisement further includes a clock display having a decrementing countdown of available time for the user to meet the challenge prescribed.

12. The method of claim 1, wherein the message for display comprises a challenge advertisement for display within an Interactive Visual Advertisement Service (IVAS) banner.

13. At least one non-transitory machine readable medium having instructions stored thereon that, when executed by a processor in a consumer platform system having at least the processor, a memory, an electronic visual display device, and an image capture device therein, the instructions cause the consumer platform system to perform operations comprising:
transmitting a message to the consumer platform system accessible to the user, the message for display on the electronic visual display device of the consumer platform system, wherein the message includes a requested action to be performed by the user using a physical object, and wherein the message further includes one or more images of a trademark or logo associated with an advertiser;
receiving at an interface of the system, a sequence of electronic images of a performed action having been performed by the user using the physical object subsequent to transmitting the message to the consumer platform system for display;
wherein the physical object is an object other than the image capture device which operates as a camera for the consumer platform system;
evaluating the sequence of electronic images of the performed action by the user using the physical object to determine (i) whether the performed action and the physical object within the sequence of electronic images substantially matches the requested action to be performed by the user using the physical object in accordance with the message transmitted and (ii) whether the physical object in the sequence of electronic images includes the trademark or logo associated with the advertiser; and
transmitting a notification for display on the electronic visual display device of the consumer platform system when the evaluation of the sequence of electronic images is determined to substantially match the requested action of the message and the physical object in the sequence of electronic images includes the trademark or logo associated with the advertiser, wherein the notification includes information regarding a reward, discount, coupon, or incentive provided by the advertiser.

14. The at least one non-transitory machine readable medium of claim 13, wherein the advertisement further includes a clock display having a decrementing countdown of available time for the user to meet the challenge prescribed.

15. The at least one non-transitory machine readable medium of claim 13, wherein evaluating the sequence of electronic images of the performed action by the user to determine whether the performed action by the user substantially matches the requested action of the message comprises:
comparing the sequence of electronic images of the performed action by the user to a sequence of electronic images of the requested action to be performed by the user.

16. The at least one non-transitory machine readable medium of claim 15, wherein comparing the sequence of electronic images of the performed action by the user to a sequence of electronic images of the requested action to be performed by the user comprises:
processing an object or gesture recognition algorithm to recognize both:
a) the physical object or gesture in the sequence of electronic images of the requested action to be performed by the user; and
b) the performed action by the user as determined from the sequence of electronic images.

17. A method at a consumer platform system having at least a processor, a memory, an electronic visual display device, and an image capture device therein, wherein the method comprises:
receiving a message for display on an electronic visual display device of the consumer platform system, wherein the message includes a requested action to be performed by a user using a physical object, and wherein the message further includes one or more images of a trademark or logo associated with an advertiser;
capturing, via the image capture device operating as a webcam for the consumer platform system, a sequence of electronic images of a performed action having been performed by the user using the physical object subsequent to receiving the message at the consumer platform system for display;
wherein the physical object is an object other than the image capture device which operates as the webcam for the consumer platform system;
sending the sequence of electronic images for evaluation to determine whether the performed action and the physical object within the sequence of electronic images substantially matches the requested action to be performed by the user using the physical object in accordance with the message received at the consumer platform system;
wherein the evaluation of the sequence of electronic images comprises determining whether the physical object in the sequence of electronic images includes the trademark or logo associated with the advertiser; and
receiving a notification for display on the electronic visual display device of the consumer platform system indicating the evaluation of the sequence of electronic images determines that the performed action by the user using the physical object having thereupon the trademark or logo substantially matches the requested action of the message, wherein the notification includes information regarding a reward, discount, coupon, or incentive provided by the advertiser.

18. The method of claim 17, wherein sending the sequence of electronic images for evaluation comprises sending the sequence of electronic images to a computing device remote from the consumer platform system at a different physical location via the Internet.

19. The method of claim 18, wherein the consumer platform system is embodied by one of:
a hand-held smartphone device;
a tablet computing device;
a personal computer;
a laptop; and
a kiosk in a supermarket, retail outlet, or publicly accessible venue.

20. A system comprising:
a processor and a memory to perform instructions;
an interface of the system to transmit a message from the system to a consumer platform system accessible to a user, the message for display on an electronic visual display device of the consumer platform system having at least an electronic visual display device and an image capture device therein, wherein the message includes a requested action to be performed by the user using a physical object, and wherein the message further includes one or more images of a trademark or logo associated with an advertiser;
the interface of the system to further receive a sequence of electronic images of a performed action having been performed by the user using the physical object subsequent to transmitting the message to the consumer platform system for display via the electronic visual display device;
wherein the physical object is an object other than the image capture device which is to operate as a camera for the consumer platform system;
a promotions engine to evaluate the sequence of electronic images of the performed action by the user using the physical object to determine (i) whether the performed action and the physical object within the sequence of electronic images substantially matches the requested action to be performed by the user using the physical object in accordance with the message transmitted and (ii) whether the physical object in the sequence of electronic images includes the trademark or logo associated with the advertiser; and
the promotions engine further being configured to cause the interface of the system to transmit a notification for display on the electronic visual display device of the consumer platform system when the evaluation of the sequence of electronic images is determined to substantially match the requested action of the message and the physical object in the sequence of electronic images includes the trademark or logo associated with the advertiser, wherein the notification includes information regarding a reward, discount, coupon, or incentive provided by the advertiser.

21. The system of claim 20, further comprising:
the processor and the memory to execute an object or gesture recognition algorithm to determine whether the performed action by the user substantially matches the requested action of the message.

22. The system of claim 20, further comprising:
non-transitory storage to store a sequence of electronic reference images from the advertiser, the sequence of electronic reference images to be evaluated by the system to establish reference objectives for matching against the received sequence of electronic images to determine whether the performed action by the user substantially matches the requested action of the message.

23. The system of claim 20, wherein the advertisement further includes a clock display having a decrementing countdown of available time for the user to meet the challenge prescribed.

24. The method of claim 17, wherein evaluating the sequence of electronic images of the performed action by the user to determine whether the performed action by the user substantially matches the requested action of the message comprises:
comparing the sequence of electronic images of the performed action by the user to a sequence of electronic images of the requested action to be performed by the user by processing an object or gesture recognition algorithm to recognize each of:
a) the physical object or gesture in the sequence of electronic images of the requested action to be performed by the user;
b) the performed action by the user as determined from the sequence of electronic images; and
c) the trademark or logo associated with the advertiser.

* * * * *